United States Patent [19]

Kellar et al.

[11] 4,349,375
[45] Sep. 14, 1982

[54] DEFORMABLE VACUUM MOLD FOR SHAPING GLASS SHEETS

[75] Inventors: John D. Kellar, Pontypool; Gordon F. Pereman, Columbus, both of Canada

[73] Assignee: PPG Industries, Inc., Pittsburgh, Pa.

[21] Appl. No.: 314,291

[22] Filed: Oct. 23, 1981

Related U.S. Application Data

[63] Continuation-in-part of Ser. No. 131,337, Mar. 18, 1980, Pat. No. 4,297,118.

[51] Int. Cl.³ ............................. C03B 25/035
[52] U.S. Cl. .............................. 65/291; 65/104; 65/106; 65/107; 65/273; 65/287
[58] Field of Search ............... 65/104, 107, 106, 268, 65/273, 287, 291

[56] References Cited

U.S. PATENT DOCUMENTS

| | | | |
|---|---|---|---|
| 2,131,873 | 10/1938 | Goodwillie | 65/273 |
| 2,182,448 | 10/1939 | Paddock | 65/287 |
| 2,261,033 | 10/1941 | Marshall | 65/287 |
| 2,442,242 | 5/1948 | Lewis | 65/104 X |
| 2,570,309 | 10/1951 | Black | 65/285 X |
| 2,663,974 | 12/1953 | Thomson | |
| 3,077,753 | 2/1963 | Dammers | 65/106 |
| 3,106,464 | 10/1963 | Dammers | 65/291 |
| 3,265,484 | 8/1966 | Ritter | 65/104 |
| 3,389,984 | 6/1968 | Englehart et al. | 65/287 |
| 3,459,521 | 8/1969 | Nedelec | 65/106 X |
| 3,607,187 | 9/1971 | McMaster | 65/287 |
| 3,778,244 | 12/1973 | Nedelec et al. | 65/275 X |
| 3,846,104 | 11/1974 | Seymour | 65/106 X |
| 4,092,141 | 5/1978 | Frank et al. | 65/114 |
| 4,187,095 | 2/1980 | Frank | 65/104 |
| 4,197,108 | 4/1980 | Frank et al. | 65/273 |
| 4,202,681 | 5/1980 | McMaster et al. | 65/104 |
| 4,204,853 | 5/1980 | Seymour | 65/106 |
| 4,204,854 | 5/1980 | McMaster et al. | 65/106 |
| 4,221,580 | 9/1980 | Frank | 65/273 |
| 4,227,908 | 10/1980 | Seymour | 65/106 |
| 4,229,199 | 10/1980 | Seymour | 65/106 |
| 4,229,200 | 10/1980 | Seymour | 65/106 |
| 4,233,049 | 11/1980 | Seymour | 65/106 |
| 4,252,552 | 2/1981 | Frank | 65/106 |
| 4,272,274 | 6/1981 | Frank et al. | 65/273 |
| 4,277,276 | 7/1981 | Kellar et al. | 65/106 |
| 4,280,828 | 7/1981 | Seymour | 65/106 |
| 4,282,026 | 8/1981 | McMaster et al. | 65/273 |
| 4,285,715 | 8/1981 | Frank | 65/106 |
| 4,298,368 | 11/1981 | Seymour | 65/25.2 |

*Primary Examiner*—Arthur D. Kellogg
*Attorney, Agent, or Firm*—Edward I. Mates

[57] ABSTRACT

In the shaping of sheets of heat-softenable material such as glass and other deformable materials, a hot sheet engages an apertured lower sheet of a deformable vacuum box while the sheet and the box are flat and conforms to the changing shape of the box. Since the box intermittently engages a hot deformable sheet for shaping and releases the deformed sheet after shaping, its lower apertured sheet is exposed to a wide temperature cycle, which causes the lower apertured sheet to warp away from the shape desired for the deformable sheet. The present invention provides structure for the deformable box that avoids such warpage while retaining the ability of the box to maintain sufficient vacuum to hold and distort the hot sheet while the box changes shape into its desired configuration with minimum warpage therefrom so that the hot sheet develops a desired curved configuration while held thereagainst during deformation of the box.

14 Claims, 7 Drawing Figures

DEFORMABLE VACUUM MOLD FOR SHAPING GLASS SHEETS

CROSS-REFERENCE TO RELATED APPLICATION

This application is a continuation-in-part of U.S. patent application Ser. No. 131,337 of John D. Kellar and Gordon F. Pereman filed Mar. 18, 1980 for "Controlling Overheating of Vacuum Mold Used to Shape Glass Sheets" now U.S. Pat. No. 4,297,118.

BACKGROUND OF THE INVENTION

1. Field of the Invention

This invention relates to shaping and cooling sheets of heat-deformable material, and particularly to improved apparatus for the high speed production of bent glass sheets that are toughened by air quenching, and most particularly, apparatus superior to that of U.S. Pat. No. 4,277,276 for shaping and heat treating relatively thin glass sheets, particularly those having a nominal thickness of ⅛ inch (3.2 mm) or less. Thinner glass sheets sag more readily than thicker glass sheets at any given elevated temperature above the glass deformation temperature. Hence, it is more difficult to control the shape imparted to thinner glass sheets.

Shaped and tempered glass sheets are widely used as side windows or rear windows in vehicles such as automobiles or the like and, to be suitable for such application, flat glass sheets must be shaped to precisely defined curvatures dictated by the shape and outline of the frames defining the window openings into which the glass side or rear windows are installed. It is also important that the side or rear windows meet stringent optical requirements and that the windows be free of optical defects that would tend to interfere with the clear viewing therethrough in their viewing area. Any distortion in a shaping member that engages a heat-softened sheet to help shape the latter is replicated in the major surface of the sheet and may result in an optically deficient surface of the shaped sheet.

During fabrication, glass sheets intended for use as shaped windows in vehicles are subjected to thermal treatment to temper the glass for strengthening the same and increasing the resistance of the shaped windows to damage resulting from impact. In addition to increasing the resistance of glass sheets to breakage, tempering also causes glass sheets to fracture into relatively small, relatively smoothly surfaced fragments that are less injurious than the relatively large, jagged fragments that result from the more frequent breakage of untempered glass.

One type of commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and along an extension of said path into a shaping station where each glass sheet in turn is engaged by a vacuum mold. The vacuum mold lifts and holds the heat-softened glass sheet by suction. At about the same time, a transfer and tempering ring having an outline shape conforming to that desired for the glass sheet slightly inboard of its perimeter moves upstream into a position below the vacuum mold. Release of the vacuum deposits the glass sheet onto the tempering ring. The tempering ring supports the peripheral portion of the glass sheet while it conveys the glass sheet into a cooling station for rapid cooling.

In prior art apparatus, the vacuum mold was either provided with a lower, rigidly curved shaping surface that shaped the heat-softened glass sheet incrementally by suction thereagainst or had a smoothly surfaced flat shaping surface that lifted the flat glass sheet by suction thereagainst and depended on a release of the vacuum within the mold to permit the hot glass sheet to drop by gravity or by a combination of gravity and an additional force onto the tempering ring to develop the shape dictated by the outline configuration of the tempering ring. Such processes as the latter have been called drop forming.

When a rigid, curved surface is adjacent a heat-softened flat glass sheet during the application of suction through said surface, much power is need to obtain the suction necessary to lift and shape a hot glass sheet simultaneously by suction at a rate sufficiently rapid to provide a high speed mass production operation for shaping and tempering glass sheets. When a flat glass sheet is shaped by drop forming, the maximum depth of bend obtainable depends on the glass thickness, glass temperature and distance the glass is dropped. It is difficult to control the shape of thin glass sheets, particularly those heated to excessive temperature. Furthermore, if the drop distance is increased to make possible a deeper bend, more time is needed to lift the glass sheet the longer drop distance, thereby limiting the maximum rate at which bent and tempered glass sheets can be produced.

Recently, deformable vacuum molds have been developed for use in shaping heat-softened glass sheets. The vacuum molds are flat initially to engage one or more flat glass sheets and deform while suction is applied to hold the heat-softened glass thereagainst and deform the latter into a desired shape conforming to that of the deformed mold. The original vacuum molds were suitable for producing feasibility samples of shaped tempered windows. The present invention is needed to obtain deformable vacuum molds that can withstand the rigors of mass production of thousands of bent tempered windows without requiring that it be replaced.

2. Description of Patents of Interest

U.S. Pat. No. 2,663,974 to Robert W. Thomson bends heat softened glass sheets between flexible strips of metal that are weighted and a pair of rigid glass sheet support members that have upper edge surfaces curved convexly in elevation to conform to the shape desired for a rectangular glass sheet after it has been shaped. The weighted strips bear down on the upper surface of the glass sheet to distort the latter to conform to the convexly curved upper edge surfaces. No vacuum or transfer device is included in this apparatus.

U.S. Pat. No. 3,077,753 to August Dammers discloses a press bending mold in which a vertically suspended, heat softened glass sheet is press bent against a rigid, convexly curved, forming die by pressing a resilient sheet of fabric that is spring loaded to apply pressure against the surface of the glass sheet opposite the surface that faces the rigid die of convex configuration. No transfer to a second shaping member and no vacuum operation is included in this patented construction.

U.S. Pat. No. 3,106,464 to August Dammers moves a rigid die of convex configuration against one surface of a heat softened glass sheet while the opposite surface is forced against a flexible frame to shape the glass sheet and the frame. The frame is then shaped still further at its ends by pistons that engage the opposite ends of the frame against the ends of the convex die. There is no vacuum used in the bending method of this patent.

U.S. Pat. No. 3,265,284 to George F. Ritter Jr. discloses a flexible belt that is located between an upper pressing mold of convex configuration and a lower mold of concave configuration. The lower mold is lifted to bring a heat softened glass sheet carried by the flexible belt into engagement against the downwardly facing surface of the upper mold. When the lower mold retracts, the belt moves the shaped glass sheet onto a roller conveyor that transports the glass through a quenching area where it is cooled. The lack of peripheral support for the glass sheet causes a loss of shape control so that the ultimate shape of the glass sheet after it is cooled can not be controlled from the shape imparted at the press bending station where the glass sheet supported on the flexible belt is sandwiched in pressurized engagement between the upper and lower molds.

U.S. Pat. No. 3,389,984 to Oscar D. Englehart and James S. Shuster is similar to the aforementioned Ritter patent in providing a flexible ribbon of material superimposed over the shaping surface of a pressing mold of concave configuration to provide a run between said concave mold and one surface of a heat softened glass sheet to be press bent. In this patent, the glass sheet is suspended from tongs. The other surface of the glass sheet faces a press bending mold of convex configuration. Relative movement of the molds toward one another presses a shape onto the glass sheet. The glass sheet is then supported solely by tongs for transfer into a cooling area where stresses are imparted to the glass depending upon the rate of cooling. Lack of peripheral support and lack of a vacuum support characterize this press bending operation.

U.S. Pat. No. 3,459,521 to Maurice Nedelec supports a flat glass sheet on a hammock while the glass sheet in a heat softened state is pressed between upper and lower molds of complementary configuration. The glass sheet is somehow removed from the hammock and quenched.

U.S. Pat. No. 3,607,187 to Harold A. McMaster lifts a soft, flat glass sheet by lowering a vacuum mold toward said sheet and applying suction through a downwardly facing, permanently curved, shaping surface of a vacuum mold to shape the sheet by suction thereagainst. Much power is needed to provide the suction necessary to shape the entire flat glass sheet to conform to the permanently curved shape of the vacuum mold in incremental portions, particularly those portions most widely spaced from the vacuum mold when other portions are initially engaged by the vacuum mold. This method, if useful at all, is only practical for producing extremely shallow bends and is too time consuming for high speed production. This patent also moves the vacuum mold horizontally over a conveyor belt from a shaping station beyond an enclosed heating furnace to a cooling station. The mold engages the glass sheet by vacuum during its transfer to the cooling station and then releases the vacuum to redeposit the glass sheet without peripheral support onto the conveyor belt. Lack of peripheral support may result in the glass sheet losing its desired shape.

U.S. Pat. No. 3,846,104 to Samuel L. Seymour provides method and apparatus in which glass sheets are conveyed through a furnace on conveyor means, and heated while passing through the furnace to a temperature approximating the glass softening point. At a shaping station beyond the furnace, each glass sheet in turn is lifted by a lower outline shaping mold which raises the glass sheet into engagement with an upper vacuum mold having a shape conforming to that desired for the glass. The upper vacuum mold remains at the shaping station and holds the shaped glass thereagainst as the lower shaping mold retracts to below the level of the conveyor means. A tempering ring shaped to support the bent glass sheet adjacent its marginal or peripheral edge only, moves generally horizontally between the shaping station and a cooling station to receive each shaped glass sheet released by the vacuum mold at the shaping station and transfer it to the cooling station. Therefore, each glass sheet must be lifted in its entirety to an elevated position a minimum vertical distance for transfer to said vacuum mold, a time consuming step.

U.S. Pat. No. 4,092,141 to Robert G. Frank and DeWitt W. Lampman provides similar apparatus with vertically movable sheet transfer means for rapidly removing from the tempering ring each bent glass sheet after its surfaces harden sufficiently to permit it to be conveyed on an additional downstream conveyor. The latter provides a glass sheet supporting surface at an elevation higher than the level at which the glass sheet is supported by the transfer and tempering ring. The apparatus of this patent also provides for lifting each glass sheet toward the upper vacuum mold. Other patents showing similar apparatus are U.S. Pat. Nos. 4,187,095; 4,221,580; 4,252,552; and 4,285,715 to Robert G. Frank and U.S. Pat. Nos. 4,197,108 and 4,272,274 to Robert G. Frank, Rudy Canonaco and Richard V. Poseny.

The invention of U.S. Pat. No. 4,233,049 of Samuel L. Seymour discloses a glass sheet shaping and tempering method in which each glass sheet, upon leaving a heating furnace, is elevated by means of a flat vacuum platen which is brought into contact with the upper surface of the heat-softened, flat glass sheet. After the vacuum platen and the glass sheet rise to an elevated position, a shaping and tempering ring having an outline configuration that corresponds in elevation and plan outline to corresponding portions of a supported bent glass sheet is conveyed into a position beneath the glass sheet, the vacuum is released, and the glass sheet drops onto the shaping and tempering ring to effect the bending by the drop forming process to a shape conforming to the outline configuration. The shaping and tempering ring is then retracted from beneath the vacuum platen and passed into a tempering station where blasts of air are directed onto the opposite surfaces of the drop formed glass sheet to temper the glass. While this arrangement provides a flat surface for the vacuum mold that is easier to smooth than a curved surface, and simplifies change-over from one shape to another since the bending and tempering ring is the only major element of the shaping and tempering apparatus which must be reconstructed or replaced to produce different configurations, drop forming has limitations. For example, the depth of bend that can be accomplished thereby without losing control over the overall shape of the treated glass sheet is limited. Other patents to Samuel L. Seymour that use drop forming in a glass sheet shaping operation include U.S. Pat. Nos. 4,204,853; 4,227,908; 4,229,199; 4,229,200; 4,280,828; and 4,298,368.

U.S. Pat. No. 4,282,026 to Harold A. McMaster et al discloses an apparatus for bending and tempering glass in which a hot glass sheet is engaged by a vacuum holder and then transferred onto an outline transfer and tempering ring having an outline configuration that corresponds in elevation and plan outline to corresponding portions of a supported bent glass sheet. The glass sheet is transferred from the vacuum holder to the shaping and tempering ring in a hot atmosphere and is permitted to sag by gravity while the ring retains the glass sheet thereon in the hot atmosphere of the shaping station and during its transfer into a cooling station. The time that the glass sheet is supported on the shaping and tempering ring until blasts of cold air harden the supported sheet is correlated so as to enable the glass to sag to its desired final configuration from the moment of its transfer from the vacuum holder to the shaping and tempering ring until the glass is cool enough for its shape to have set. Other patents that disclose this glass sheet shaping technique are U.S. Pat. Nos. 4,202,681 and 4,204,854 to Harold A. McMaster et al.

In U.S. Pat. No. 4,277,276 to John D. Kellar and Gordon F. Pereman, the glass sheet bending art provides a glass sheet shaping and tempering technique that uses a deformable vacuum mold having a glass engaging surface as smooth as that of flat vacuum molds of the prior art, and that also shapes the glass sheet to a shape approximately its final desired shape within a heating furnace before releasing the glass sheet onto a shaping and tempering ring to make it possible to increase the speed of a mass production operation for shaping and tempering glass sheets, particularly those thinner than 3.2 mm nominal thickness. Shaping thin glass sheets within a heating furnace saves energy because it avoids the need to overheat the glass, which cools rapidly en route to a shaping station outside the furnace. The deformable vacuum mold disclosed in this patent was excellent to make a few feasibility samples of bent tempered windshields for potential customers.

It is difficult to control the shape and temperature of vacuum molds permanently installed within a furnace. It is also difficult to obtain access to repair or provide routine maintenance for a mold that is permanently installed within a furnace. The glass sheet bending art needed a deformable vacuum holder or mold that would retain its flexibility over a long period of use to fabricate bent, tempered windows at mass production rates despite the frequent periodic cycling of the vacuum holder over a wide temperature range.

SUMMARY OF THE PRESENT INVENTION

The present invention provides a sheet shaping apparatus that comprises a holder for a sheet of deformable material such as glass that includes a deformable box of improved structure that first engages and lifts a heat-softened glass sheet by suction, and that provides clearance for a shaping and tempering ring to enter the shaping station. The glass sheet shaping apparatus of the present invention comprises a deformable box composed of materials capable of withstanding a wide temperature range so that it can be located within the heating furnace to engage and lift a heat-softened glass sheet by suction during the shaping operation and can be moved outside the furnace between successive bending operations. Such movement heats and cools the vacuum mold intermittently. Such intermittent heating and cooling is arranged to control the temperature rise and consequently the shape of the vacuum mold.

In a preferred embodiment of this invention, the deformable box comprises an upper flexible sheet of fluid-impervious material, a lower apertured sheet of fluid-impervious material, both preferably of thin sheet metal, a plurality of openwork plates of thin flexible material (also preferably metal) interposed and interconnected between the upper and lower flexible sheets to provide a plurality of chambers enclosed between the flexible sheets. Means is provided to communicate said chambers with a source of vacuum or pressure for delivery through said apertured lower flexible sheet to hold a hot glass sheet in pressurized engagement thereagainst by vacuum. Additional means is provided to distort the box while applying vacuum to said chambers to shape the sheet thereagainst. When vacuum is discontinued or replaced by pressurized fluid within the box, the bent glass sheet is released. Providing flexible openwork plates that can slide relative to one another throughout the thickness of the deformable box when the latter changes shape avoids distortion of the apertured bottom plate from the shape it is desired to assume. Using metal, preferably thin, flexible steel, for the sheets and openwork plates of the deformable box insures a long life for the deformable box despite the repeated temperature cycling over a wide range of temperatures that it must experience during mass production use.

The present invention will be better understood in the light of a description of a preferred illustrative embodiment and variations thereof that follows, which description includes the accompanying drawings wherein like reference numbers refer to like structural elements.

DESCRIPTION OF THE PREFERRED EMBODIMENTS

Figure 1:
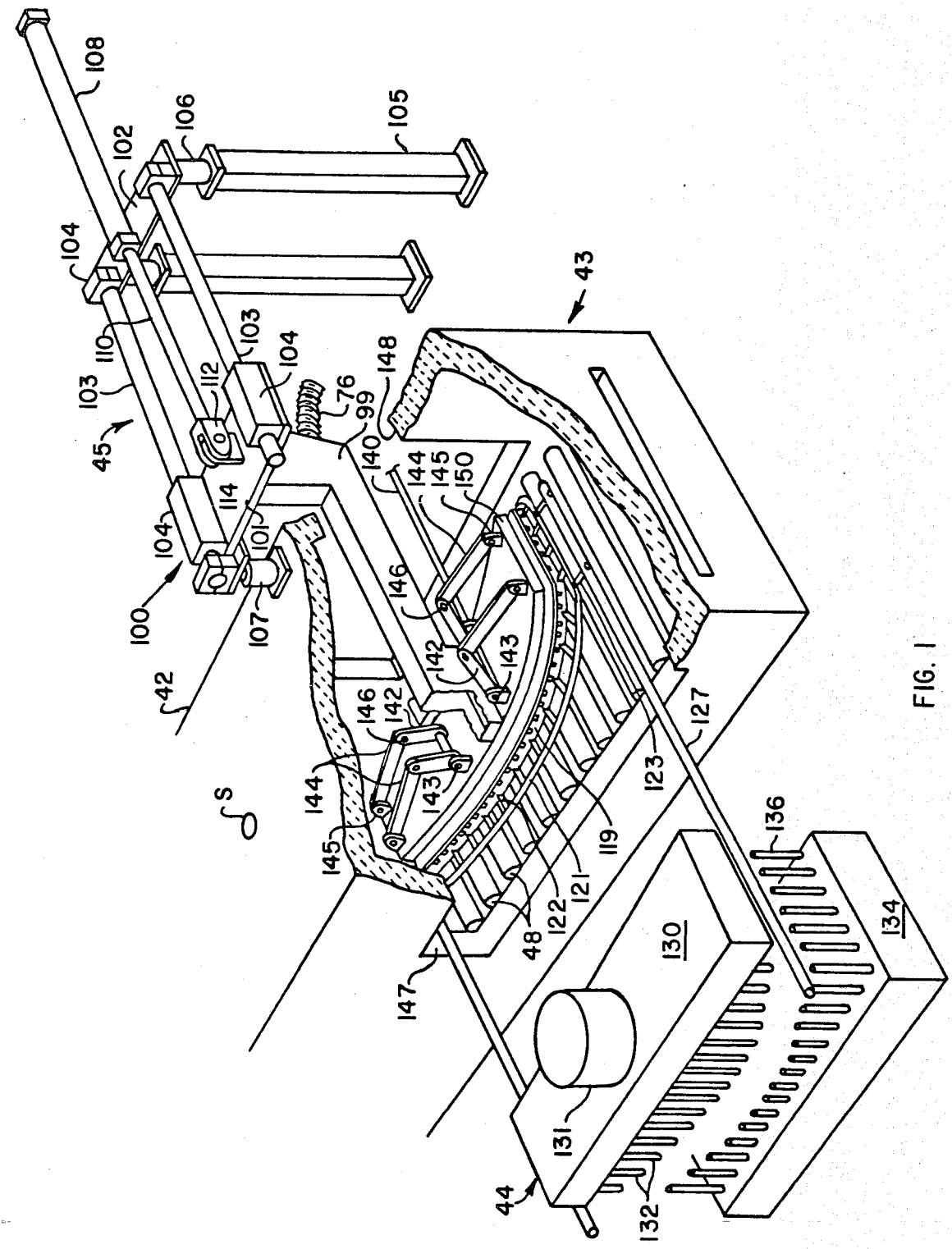
FIG. 1 is a fragmentary, perspective view of apparatus for shaping and tempering glass sheets incorporating a preferred embodiment of the present invention comprising a shaping station located within a roller hearth furnace, with certain parts omitted for clarity.
Figure 2:
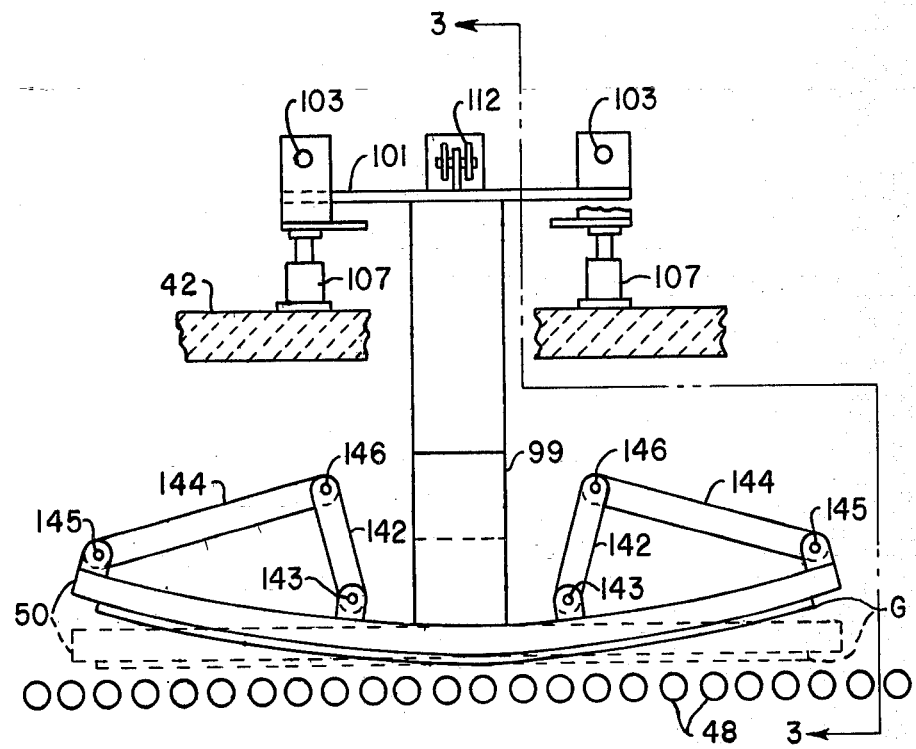
FIG. 2 is an elevational side view of the apparatus of FIG. 1 with parts omitted to show a simplified illustration of the structure of a deformable box included in the preferred embodiment in full lines in its glass shaping configuration and showing in phantom its configuration while flat to engage a flat glass sheet.
Figure 3:
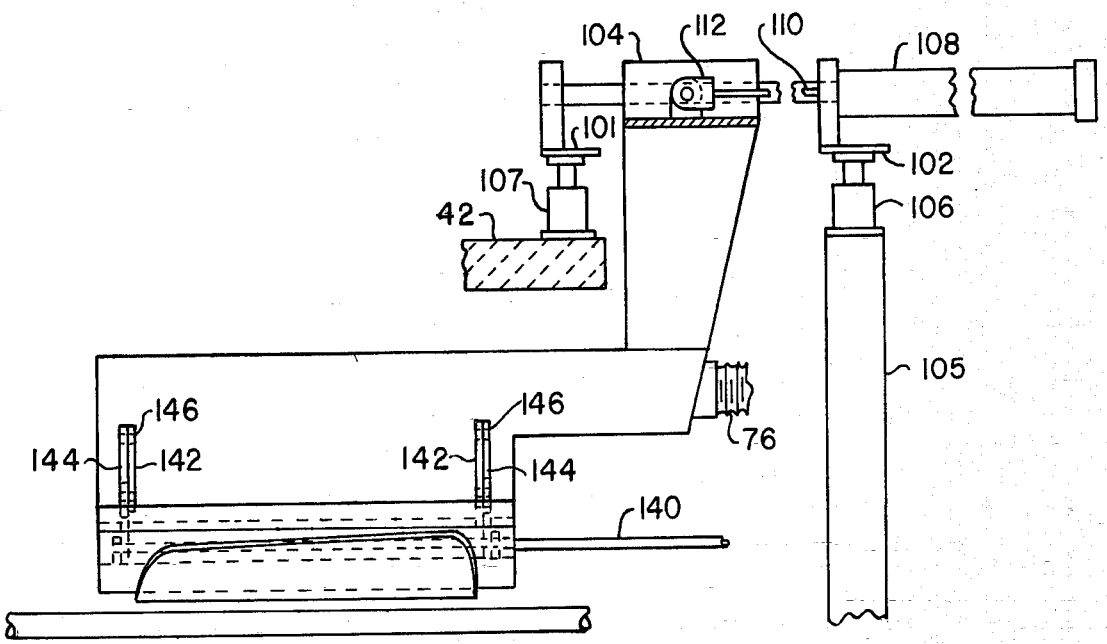
FIG. 3 is a sectional view along the line 3—3 of FIG. 2 with certain parts omitted or broken away to show other parts of the apparatus more clearly.
Figure 4:
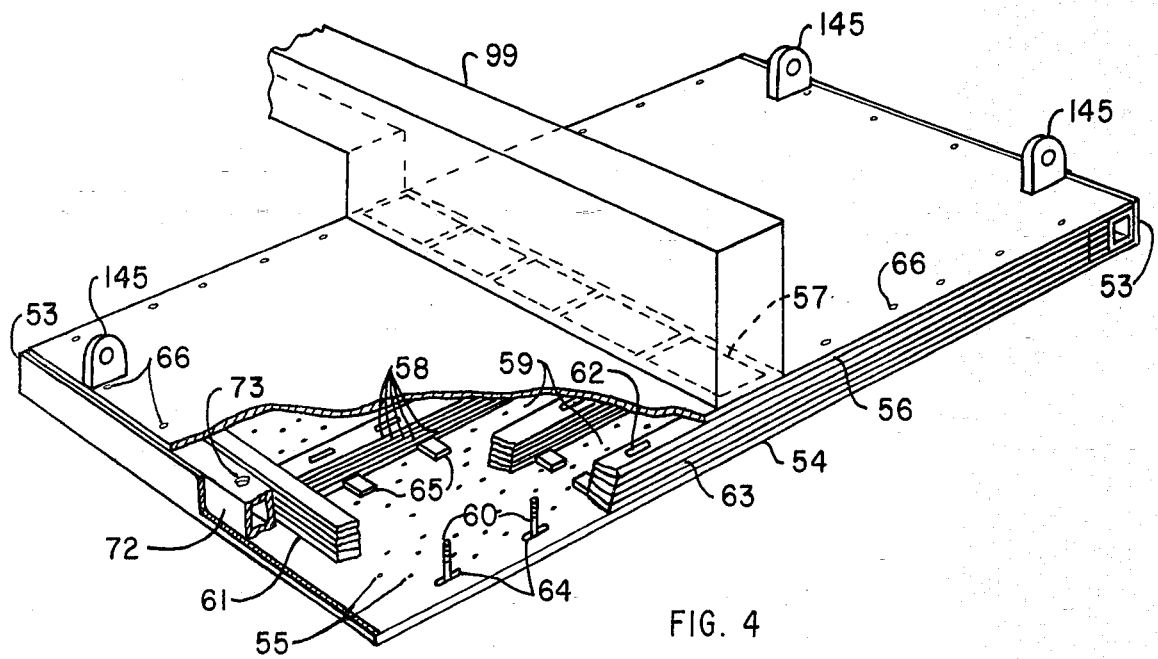
FIG. 4 is a fragmentary, perspective view of the deformable box with parts removed to show other parts more clearly.
Figure 5:
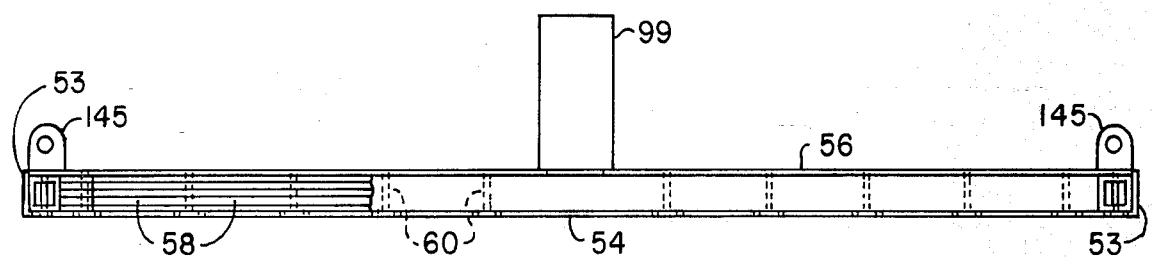
FIG. 5 is a longitudinal sectional view of the deformable box of FIG. 4, showing its deformable shaping surface in its flat configuration to lift and shape a flat glass sheet; and with certain parts omitted to show certain interior structural elements.
Figure 6:
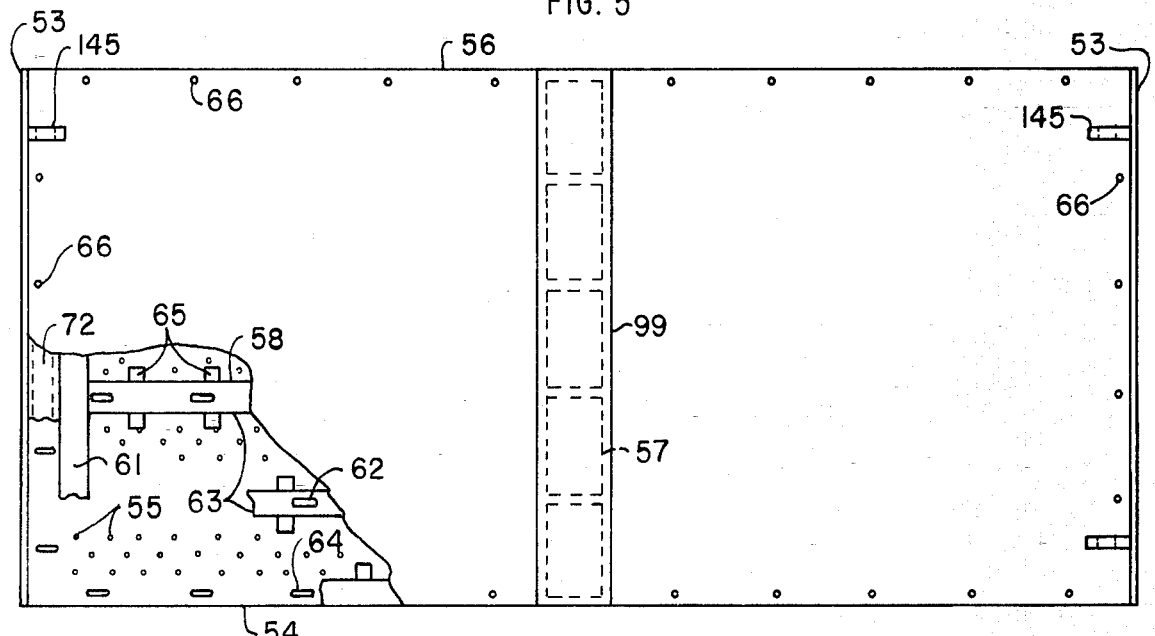
FIG. 6 is a fragmentary plan view of the deformable box of FIGS. 4 and 5, with certain parts omitted to show certain interior structural elements more clearly.
Figure 7:
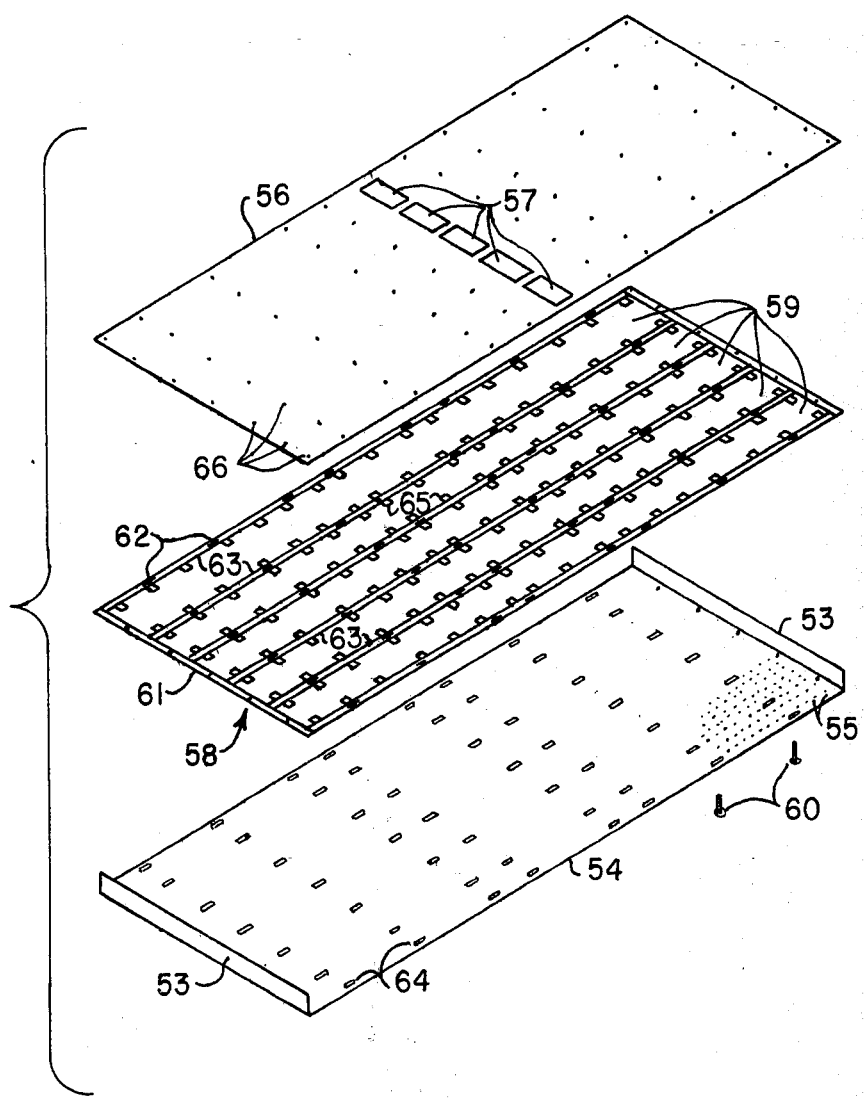
FIG. 7 is an exploded view in perspective of certain elements of the deformable box depicted in FIG. 1.

Referring now to FIG. 1 of the drawings, an apparatus for heating and shaping sheets of material, such as glass, includes a heating means including a furnace 42 (the exit end of which is shown). The furnace includes a shaping station 43 to which flat sheets of glass are conveyed from a loading station (not shown) after being heated to the glass deformation temperature. A cooling station generally indicated at 44 for cooling the sheets of glass after their shaping and an unloading station (not shown) beyond the coolng station 44 are located in end-to-end relation along a transverse path to one side of the shaping station 43. A box retraction station 45 is located to the other side of the shaping station 43 and to the side opposite the cooling station 44. A sheet transfer means 47 shown at the shaping station 43 transfers the glass sheet to the cooling station 44.

Heat may be supplied in the furnace 42 by hot gases from gas burners or by electrical radiant heaters or by a combination of both, which heat supply means are well known in the art. The furnace side walls support bearing housings for a horizontal conveyor comprising longitudinally spaced, transversely extending conveyor rolls 48 that define a path of travel which extends through the furnace 42. Additional conveyor rolls 48 are located at the shaping station 43 to form a continuation of the path of travel through the furnace 42. The rolls of the conveyor are arranged in sections and their rotational speed controlled through clutches (not shown) so that the speed of the different conveyor sections may be controlled and synchronized in a manner well known in the art. A glass sensing element S is located a short distance upstream of the shaping station 43 to initiate a cycle of operation of this apparatus.

Limit switches or electronic controllers may be provided to synchronize the operation of various elements of the apparatus according to a predetermined sequence. Since their arrangement and manner of operation are not part of this invention, they will not be described in detail herein.

The shaping station 43 comprises a deformable box 50, preferably of thin sheet metal. The latter is covered along its bottom surface with a blanket of refractory material such as fiber glass (not shown) that is folded around the opposite ends of the box and secured by clamps and/or spring means to the upper portion of the box.

The deformable box 50 comprises a pair of end wall members 53 interconnected by a lower sheet 54 of a flexible, fluid-impervious material (preferably thin sheet metal) having perforations 55 distributed throughout, and an upper sheet 56 that is also flexible, fluid-impervious and preferably thin sheet metal but has a transverse row of rectangular apertures 57 extending across its central portion. Upper and lower flexible sheets 54 and 56 are preferably of half hard tempered sheet steel, and are of rectangular outline. The flexible metal sheets 54 and 56 are spaced from one another throughout their extent by a plurality of rectangular, flexible, openwork plates 58. The latter are aligned with one another to form a plurality of elongated chambers 59, each communicating with a different one of said apertures 57. The rectanglar, flexible, openwork plates 58 each comprise a pair of cross slats 61 at each end interconnected by a plurality of parallel, transversely spaced, flexible, longitudinal slats 63. The plates 58 are secured by bolts 60 that extend through elongated attachment apertures 62 extending vertically through the flexible, longitudinal slats 63 of the openwork plates 58 and corresponding elongated attachment openings 64 i the lower flexible metal sheet 54 and additional corresponding attachment apertures 66 distributed throughout the upper metal sheet 56.

In a deformable box used successfully in commercial operations on a mass production basis, the upper and lower sheets and the openwork plates are composed of type 430 stainless steel and have thicknesses of 62 mils (1.5 millimeters). Five openwork plates are disposed between the upper and lower sheets.

The flexible longitudinal slats 63 extend parallel to one another in longitudinal rows approximately one inch (2.5 centimeters) apart. The spaces between the interconnected corresponding flexible longitudinal slats 63 form the plurality of elongated chambers 59. In the preferred embodiment of this invention, the dimensions of the rectangular apertures 57 are aligned with those of elongated chambers 59 such as to assure uniform distribution of positive or negative air pressure to the elongated chambers 59 of the deformable metal box 50 according to the criteria to be described later.

The flexible longitudinal slats 63 of the lowest openwork plate 58 adjacent the lower apertured sheet 54 may include transverse tabs 65 that extend in opposite directions from the longitudinal dimensions of the slats 63, except for the laterally outer slats, which extend only laterally inward. The transverse tabs 65 cooperate with the slats 63 to form the lowest layer of a laminated spring of thin layers, which are slidable relative to one another when the deformable box 50 changes shape. The tabs 65 are fixed to the upper surface of the lower apertured metal sheet 54 in any suitably manner such as welding or brazing.

A pair of transverse hollow metal bars 72 in the form of square members ¾ inch (19 millimeters) wide on each side interconnect the opposite end edge portions of the lower flexible metal sheet 54 and the upper flexible metal sheet 56 by additional screws 60 which are secured in place through vertical holes 73 in the upper and lower walls of the hollow bars 72 and additional screw-receiving holes 66 in the ends of upper sheet 56. The transverse hollow metal bars 72 abut the end wall members 53 to reinforce the latter. The cross slats 61 of the openwork plates 58 are separated from the hollow bars 72 a distance barely sufficient to allow for relative sliding of adjacent openwork plates 58 in response to deforming the box 50 without distorting the bottom surface of lower sheet 54 from its desired shape.

The rectangular apertures 57 across the upper sheet 56 communicate with an opening in the lower wall of an L-shaped plenum chamber 99. The latter communicates with a flexible pipe 76, which in turn selectively communicates with a vacuum source or a source of pressurized fluid such as air through appropriate valves and supply pipes in a manner well known in the art. (The sources, valves and supply pipes are not shown.)

The L-shaped plenum chamber 99 is connected to a carriage 100, which is fixed for vertical movement with the deformable metal box 50. In order to provide the vertical adjustability feature for positioning the deformable metal box 50, the carriage has a front support beam 101, a rear support beam 102, a pair of slide bars 103, and a pair of slide bar housings 104 supported on each support beam.

Each rear support beam 102 is supported on a vertical post 105. Each vertical post 105 supports its unique vertical pisto 106. The latter act in unison with a pair of front vertical pistons 107 mounted on the roof of the furnace 42 at shaping station 43 to raise or lower the front and rear support beams 102 and 102 and their supported slide bar housings 104. Such actuation moves the carriage 100 vertically, which raises or lowers the deformable metal box 50 in the shaping station 43.

A horizontal piston 108 fixed to rear support beam 102 is connected through a piston rod 110 and a piston head 112 to a lug 114 fixed to front support beam 101. Actuation of the piston rod 110 moves the deformable metal box 50 through front support beam 101 between the shaping station 43 and the mold retraction station 45.

The sheet transfer means 47 comprises a ring-like member 119 conforming in elevation and plan outline to the shape desired immediately inward of the peripheral edge of a glass sheet to be shaped at the shaping station 43. The ring-like member 119 is surrounded by a pipe type reinforcement 121. The ring-like member has an upper edge surface that is notched or serrated to minimize contact with the glass and preferably is constructed in the manner of U.S. Pat. No. 3,973,943 to Samuel L. Seymour. Connectors 122 are provided around the periphery to interconnect the ring-like member 119 and the reinforcement 121. Extension arms 123 extend outward from the opposite longitudinal ends of the outline formed by the sheet transfer means 47 and terminate in connections to cantilevered rods 127 which are actuated for movement in unison by motor drive means (not shown) to move the ring-like member 119 from shaping station 43 through cooling station 44 to an unloading station (not shown) and a return to the shaping station 43.

The cooling station 44 comprises an upper plenum 130 connected to an air supply duct 131 which delivers air under pressure from a source of tempering medium (not shown) to said upper plenum 130 for delivery through downwardly directed pipe nozzles 132 toward the upper surface of a glass sheet supported on said member 119. Additional tempering medium supply means communicates with a lower plenum 134 which is provided with upwardly directed nozzles 136 for supplying the tempering medium, such as pressurized air, against the lower surface of a glass sheet supported on said ring-like member 119.

The preferred embodiment of the present invention includes a pair of actuating rods 140, each fixed for rotation with an inner pair of links 142 of two pairs of links on each longitudinal side of the L-shaped plenum chamber 99. Inner links 142 are pivotally mounted at their inner ends to pivots 143 fixed to the upper surface of the upper sheet of the deformable metal box 50, while an outer pair of links 144 is pivotally mounted at their outer ends to pivots 145, also fixed to said upper surface. A common pivot 146 pivotally connects each inner link 142 with a corresponding outer link 144. The pivots 143 and 145 are spaced from one another a distance such that the corresponding links 142 and 144 extend at a more obtuse angle when the deformable metal box 50 defines a flat configuration and at a more acute angle relative to one another to distort the deformable metal box 50 into a convexly curved configuration.

The shaping station 43 is provided with a side opening 147 on one side facing the cooling station 44 and another side opening 148 on its opposite side facing the mold retraction station 45. These side openings are associated with doors (not shown) that are opened only when needed for the passage of the sheet transfer means 47 through side opening 147 and for the passage of the deformable metal box 50 through sid opening 148 so as to minimize loss of furnace heat between successive shaping operations.

Cycle of Operation

A plurality of glass sheets is conveyed through the furnace 42 while supported on rotating furnace conveyor rolls 48. When a glass sheet is sensed by the sensing means S, the apparatus elements of the illustrative embodiment are in positions ready to begin a shaping cycle.

At the beginning of a sheet shaping cycle, doors for openings 147 and 148 are closed when a flat glass sheet enters the sheet shaping station 43 and both the deformable box 50 and the ring-like member 119 are outside the shaping station. The box 50 is in position at the box retraction station 45 and the member 119 is at the cooling station 44 on the opposite side of the shaping station 43.

Next, the door for opening 148 retracts and the deformable box 50 is ready to enter the shaping station from its box retraction station 45 to one side of said shaping station as the glass sheet nears its destination at the shaping station.

The glass sheet G continues to travel along the conveyor rolls 48 until it reaches a shaping position within the sheet shaping station 43, and the horizontal piston rod 108 extends to urge the deformable box 50 to enter the shaping station 43 until the deformable box is in vertical alignment over the glass sheet at the shaping position. The deformable box 50 is in its flat configuration and vacuum has been started to lift the hot, flat glass sheet into engagement against the deformable box 50 when the latter is flat.

As soon as the flat glass sheet G engages the box 50, pistons 106 and 107 extend upward in unison to cause the vacuum mold to lift the glass sheet. At the same time, a door to opening 147 opens to permit the ring-like member 119 to move into the shaping station and actuating rods 140 rotate to cause the metal box 50 to deform upwardly at its longitudinal end portions. Vacuum continues to be applied to the deforming box 50 so that the glass sheet G continues to engage said box as it is lifted and shaped.

Opening 147 opens completely to allow the sheet transfer means 47 including said ring-like member 119 to enter the shaping statio 43 as the defoming box continues to lift and shape the glass sheet.

The pistons 106 and 107 continue to lift the deformable box 50 and the actuating rods 140 continue to rotate until the ring-like member reaches a position in the shaping statio 43 under the deformable box. At that moment, vacuum is either released or replaced by pressurized fluid in L-shaped plenum chamber 99 to drop the glass sheet onto the ring-like member.

The empty deformable metal box 50 is removed in one direction toward the box retraction station 45 by retraction of piston rod 110 while the actuating rods 140 rotate to spread the links 142 and 144. The latter movements cause the deformable box 50 to resume its flat configuration as the sheet transfer means 47 moves in a direction opposite said one direction with the glass sheet supported on its ring-like member 119 for transfer into cooling station 44.

When the transfer means 47 clears the shaping station 43, the door for opening 147 closes. Similarly, the door for opening 148 closes when the deformable metal box 50 and its associated reinforcing and actuating structure clears the shaping station. When the deformable box rests at mold retraction statio 45, the ring-like member 119 supports the bent glass sheet between upper and lower plenum chambers 130 and 134. Pressurized fluid is applied through the sets of nozzles in the cooling station 44 while the doors for the openings 147 and 148 at the opposite walls of the furnace are closed as the shaping station awaits the arrival of a succeeding glass sheet that is conveyed through the furnace toward said shaping station.

The apparatus is ready for another cycle of operation.

Various alternative embodiments may be used in the practice of the present invention. For example, any available energy source such as electrically, gas, oil, coal, etc. may be used to heat the glass sheets within the furnace. Any type of conveyor, such as a gas hearth type of conveyor or a conveyor that uses rolls in conjunction with a fluid that compensates for part of the mass of glass rotatably supported on the rolls of a roller conveyor may be substituted for the described and illustrated roller conveyor system for delivering glass sheets to the shaping station. Furthermore, the deformable box of the illustrated embodiment that moves vertically may be replaced by a deformable box that maintains a fixed position relative to vertically movable conveyor rolls and the ring-like member may be made of special rail sections to provide clearance to lower said rolls and drop a glass sheet from the deformable metal box onto the ring-like member and provide clearance for the ring-like member to transfer the glass sheet to the cooling station and to return empty to the shaping station before the vertically movable rolls rise to their glass sheet receiving position in time for the arrival of the next glass sheet to be shaped.

In another embodiment contemplated, the deformable metal box may move horizontally instead of vertically from a first mold position above the additional conveyor rolls to a second mold position above the rail-like member and change its configuration during its horizontal movement.

The present invention also contemplates that the deformable metal box may be located at a shaping station that is locatedbeyond the exit of a glass sheet heating furnace. The requirements for the components of the deformable box to be of materials capable of withstanding a wide range of temperature is not as severe as it is with the preferred embodiment described previously. However, with intermittent contact of the deformable box with a glass sheet heated to its deformation temperature followed by lack of contact with any hot element and the requirement for the deformable box to be shaped between a flat configuration and a curved configuration conforming to the configuratio to which the glass sheet is desired to be changed while it engages the deformable box by vacuum makes it nevertheless desirable for the deformable box to be composed of materials having the requisite sliding characteristics of the openwork plates between the upper and lower sheets of thin flexible sheet material that form the upper and lower walls of the deformable box of the present invention.

The cooling station may use liquids or other fluids instead of air as the cooling medium and may use slot type nozzles or bar type nozzles instead of or in combination with the pipe-type nozzles shown.

Other variations within the gist of the present invention include the substitution of flexible, laminated metal springs instead of the hollow metal bars 72 to connect the longitudinal ends of the flexible metal plates 54 and 56 to one another or to provide a single, continuous, laminated spring extending around the entire perimeter of the deformable metal box 50. The latter variations permit the metal box to be deformed about its longitudinal axis as well as about its transverse axis to produce more complex shapes. In addition, the deformable metal box may be sectionalized into a plurality of two or more smaller mold sections in the form of vacuum boxes pivoted to one another to accommodate to one or more sharply bent end regions of the glass sheet to be bent, regardless of whether the vacuum boxes comprising the vacuum mold sections are rigid or deformable. The invention is also suitable for shaping glass sheets to asymmetrical shapes where the glass sheet is bent adjacent either one or more side edges and/or one or more end edges regardless of whether the vacuum mold is a unitary mold comprising a single deformable metal box as in the illustrative preferred embodiment or a sectionalized vacuum mold.

It is also understood that while the embodiments described previously relate to shaping and tempering glass shets, the present invention can be used to shape glass sheets that are to be annealed subsequently. In such a case, the cooling station 44 is replaced by an annealing lehr section wherein the bent glass is cooled at a controlled rate after its shaping.

The form of the invention shown and described in this disclosure represents an illustrative preferred embodiment and certain modifications thereof. It is understood that the gist of the invention is defined in the claimed subject matter which follows.

We claim:

1. A deformable box for use in shaping sheets composed of glass or other deformable material comprising means adapted to connect said box to a source of vacuum, an upper flexible sheet of fluid-impervious material, an apertured lower flexible sheet of fluid-impervious material, and means to distort said box from a flat configuration to a desired curved configuration when vacuum is applied thereto and a hot sheet of deformable material is held against said apertured, lower flexible sheet, characterized by a plurality of openwork plates of thin flexible material interposed between said upper flexible sheet and said lower flexible sheet, said plates composed of a material capable of sliding relative to said other plates and said upper and lower flexible sheets over a wide range of temperatures ranging from room temperature to the softening point of said deformable material, attachment means extending through said upper flexible sheet, said lower flexible sheet and said openwork plates constructed and arranged to permit said openwork plates to slide relative to one another and to said upper and lower flexible sheets when said deformable box is distorted, thereby avoiding distortion of said lower flexible sheet from a desired shape when said box is distorted, whereby when a flat hot sheet of deformable material engages said apertured, lower flexible sheet by vacuum while said deformable box is flat, said hot sheet of deformable material deforms with the deformation of said deformable box to said desired shape and is released from said deformable box when said application of vacuum is discontinued.

2. A deformable box as in claim 1, wherein each of said openwork plates comprises a plurality of flexible longitudinal slats aligned with corresponding flexible longitudinal slats of the other openwork plates to form flexible elongated walls separating a plurality of elongated chambers within said deformable box.

3. A deformable box as in claim 2, wherein said plurality of openwork plates comprises a plate adjacent said lower flexible sheet comprising tabs extending transversely from the longitudinal slats of said plate, and means securing at least some of said tabs to said apertured, lower flexible sheet.

4. A deformable box as in claim 2, wherein said upper flexible sheet is provided with a plurality of apertures across its transverse dimension to communicate each of said elongated chambers with said source of vacuum when said box is connected thereto.

5. In combination with a deformable box as in claim 4, a plenum chamber communicating with said plurality of apertures and flexible pipe means selectively coupling said plenum chamber with said vacuum source.

6. The combination as in claim 5, further including a source of pressurized fluid and means selectively coupling said pressurized fluid source with said flexible pipe means.

7. A deformable box as in claim 1 or 2 or 3 or 4 or 5 or 6, wherein said flexible sheets and slats of said openwork plates are composed of thin metal.

8. A deformable box as in claim 7, wherein said metal of at least said openwork plates is flexible stainless steel.

9. A deformable box as in claim 7, further including a flexible fibrous cover covering said lower flexible sheet and wrapped around the longitudinal ends of said box.

10. A deformable box as in claim 7, wherein said lowr flexible sheet is provided with upturned end wall members at an opposite pair of ends thereof.

11. A deformable box as in claim 10, further including a transversely extending reinforcing member approximately coextensive with and adjacent to each of said end wall members in position to reinforce the latter.

12. A deformable box as in claim 10, wherein the longitudinal distance between said transversely extending reinforcing members is slightly greater than the length of said openwork plates to permit said openwork plates to slide relative to one another and relative to said upper and lower flexible sheets when said box is deformed.

13. A deformable box as in claim 1, wherein said flexible sheets and said openwork plates have aligned attachment openings for receiving said attachment means.

14. A deformable box as in claim 13, wherein said aligned attachment openings in said openwork plates and in one of said flexible sheets are longitudinally elongated to permit said relative sliding.

* * * * *